May 29, 1956

W. H. SILVER ET AL 2,747,489

TRACTOR-MOUNTED PLOW

Filed Dec. 9, 1950

INVENTORS.
WALTER H. SILVER
WILLIAM V. LOHRMAN
BY
*C. F. Parker & R. C. Johnson*
ATTORNEYS May 29, 1956  W. H. SILVER ET AL  2,747,489
TRACTOR-MOUNTED PLOW
Filed Dec. 9, 1950  5 Sheets-Sheet 2
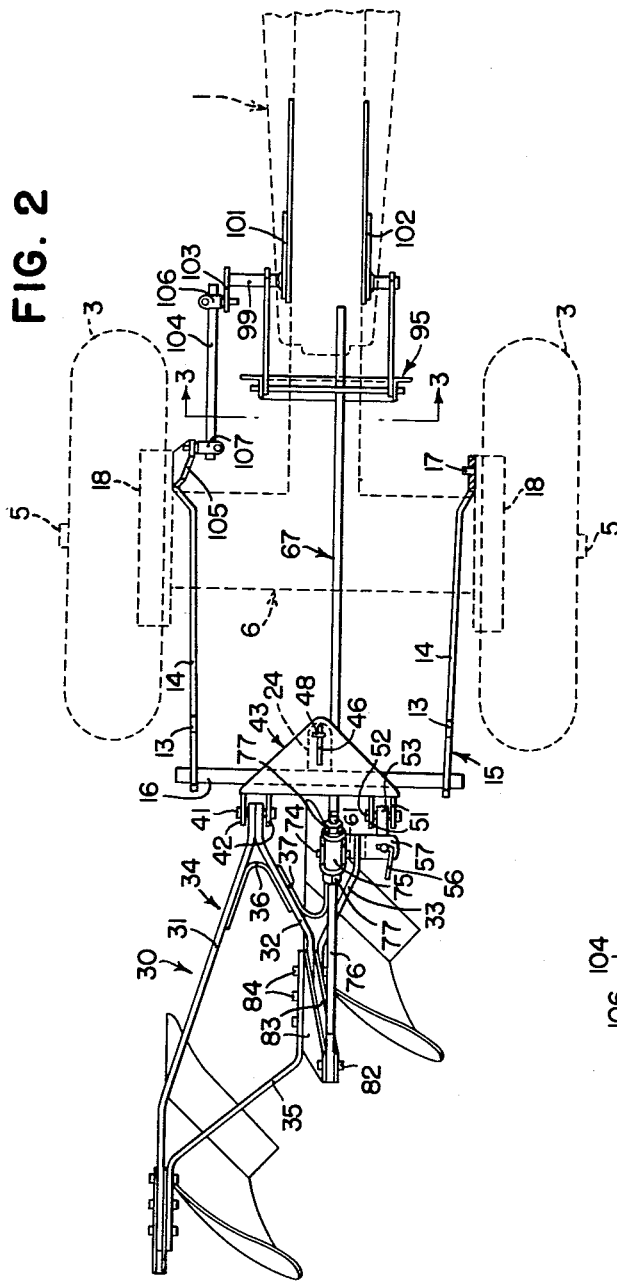
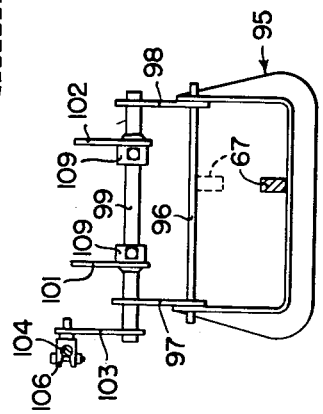
INVENTORS.
WALTER H. SILVER
WILLIAM V. LOHRMAN
BY
ATTORNEYS

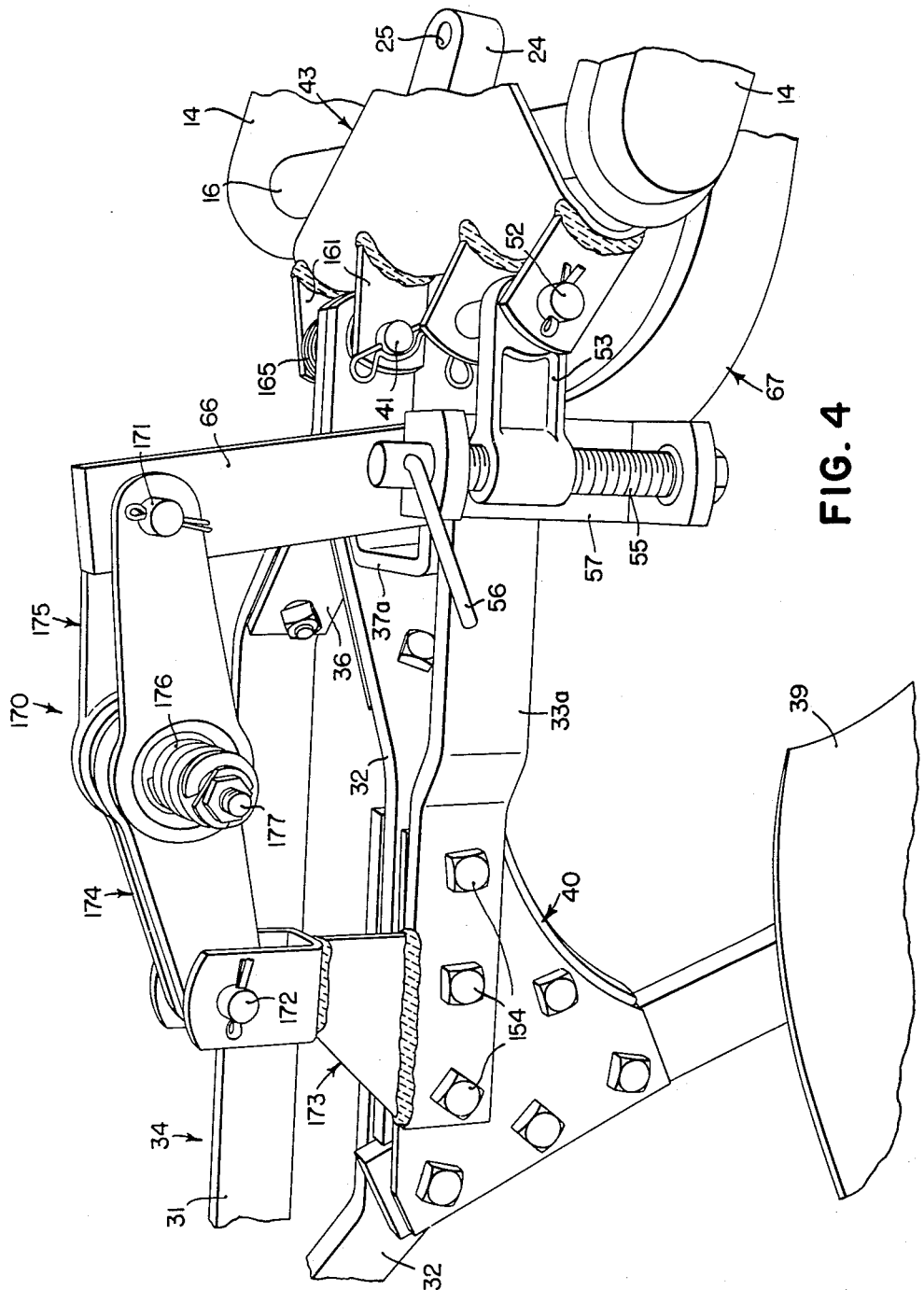

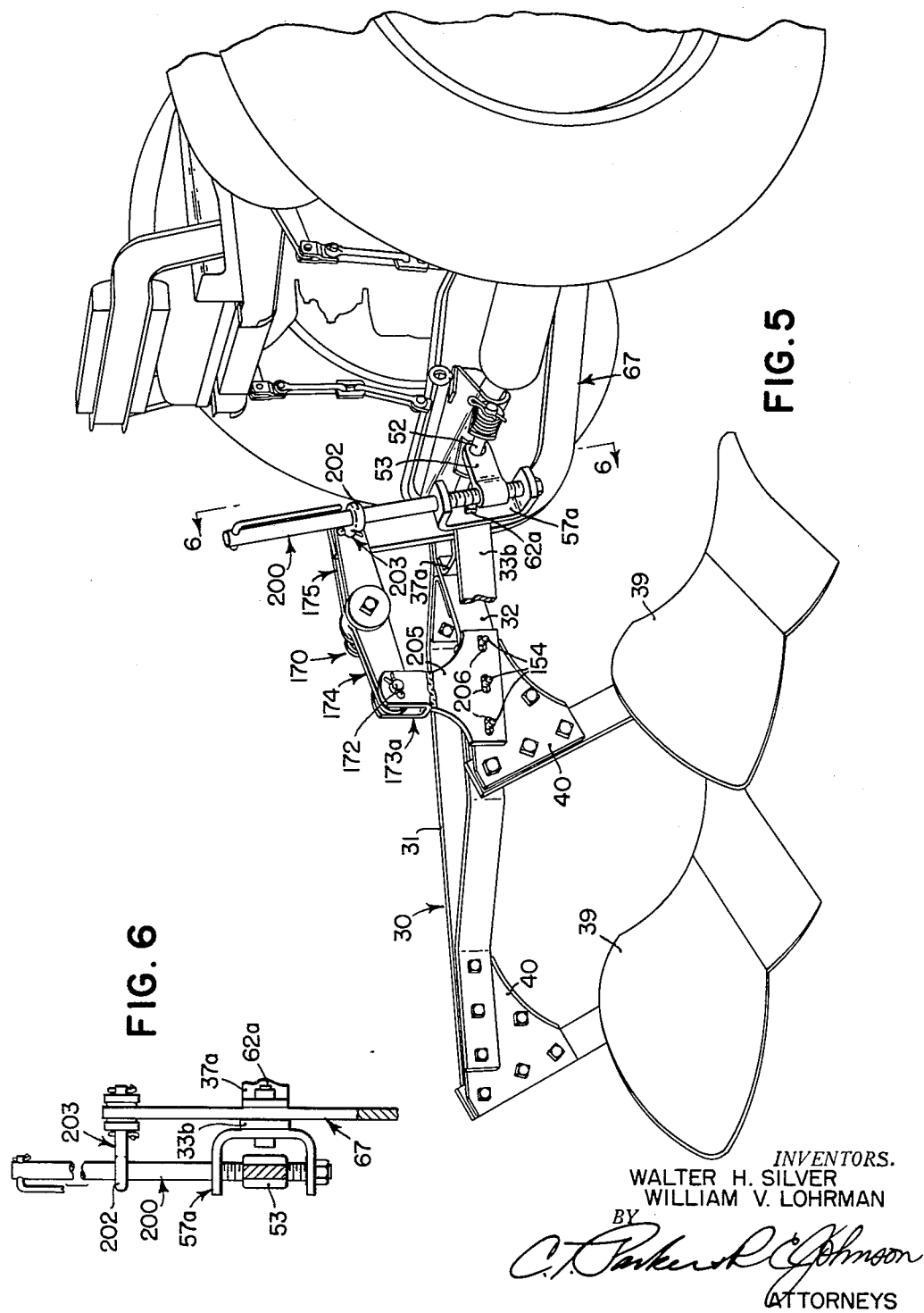

INVENTORS.
WALTER H. SILVER
WILLIAM V. LOHRMAN
ATTORNEYS

United States Patent Office 2,747,489
Patented May 29, 1956

2,747,489

TRACTOR-MOUNTED PLOW

Walter H. Silver, Moline, Ill., and William V. Lohrman, Davenport, Iowa, assignors to Deere & Company, Moline, Ill., a corporation of Illinois Application December 9, 1950, Serial No. 200,028

5 Claims. (Cl. 97—47.51)

This application is a continuation-in-part of our co-pending applications, Serial No. 578,148, filed February 16, 1945 and Serial No. 99,772, filed June 17, 1949, now U. S. Patents 2,567,736 and 2,685,241, respectively.

The present invention relates generally to agricultural machines and more particularly to integral or tractor-mounted implements.

The object and general nature of the present invention is the provision of a new and improved integral implement which may easily and quickly be attached to or detached from its supporting tractor and in which the implement may be readily attached to the tractor by packing the tractor in position, inserting a hitch pin, and then driving forwardly.

More specifically, it is an important feature of this invention to provide an agricultural implement, such as a plow, that is adapted to be attached to a vertically swingable drawbar on the propelling tractor and which is provided with new and improved means for adjusting the lateral and the fore-and-aft leveling of the plow bottom or bottoms. Another important feature of this invention is the provision of a safety trip device which protects the plow in the event one or more of the bottoms strike an obstruction and which is entirely independent of the level adjusting means.

These and other objects and advantages of the present invention will be apparent to those skilled in the art after a consideration of the following detailed description, taken in conjunction with the accompanying drawings in which the preferred forms of the present invention have been illustrated.

In the drawings:

Figure 2 is a plan view of the implement shown in Figure 1, the tractor being indicated in dotted lines in order to show the implement parts more clearly.

Figure 3 is a sectional view taken generally along the line 3—3 of Figure 2.

Figure 4 is a perspective view showing a modified form of the present invention, in which a different form of overload release is incorporated and in which the lateral leveling means is shown in more detail.

Figure 5 is a side view of another form of the present invention in which a modified lateral leveling means is provided, one in which abnormal stresses are avoided when the plow trips, as under an overload, Figure 5 also showing an adjustment associated with the overload release or trip means and providing a simple and convenient fore-and-aft leveling of the plow bottom or bottoms.

Figure 6 is a fragmentary sectional view, taken generally along the line 6—6 of Figure 5.

Figure 1:
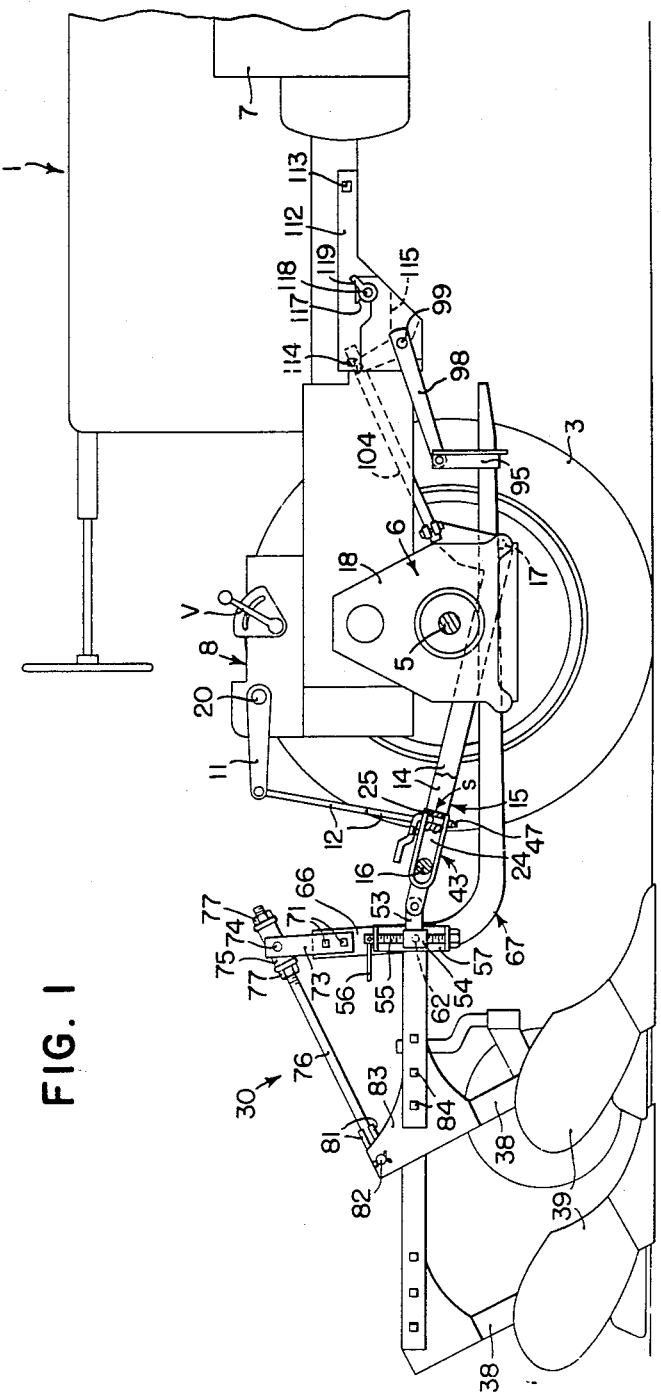
Figure 1 is a side view of a quick-detachable implement, such as a two-bottom plow, showing the same as mounted in position on its propelling and supporting tractor.

Referring now to the drawings, particularly Figures 1, 2 and 3, the reference numeral 1 indicates a farm tractor of the four-wheel type, having rear wheels 3 mounted on axle means 5 carried by a rear axle structure 6. The tractor includes a power plant 7 and a power lift unit 8 of the hydraulic type, including suitable valve mechanism V and other necessary parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The sides 14 may be strap members, and the latter are pivoted at their front ends, as at 17, to drop housings 18 which form a part of the tractor rear axle structure 6. Preferably, the rear part 16 is welded or otherwise permanently secured to the side parts 14 of the tractor drawbar or bail 15. The two power lift arms 11 are clamped or otherwise fixed in any suitable manner to the ends of a power lift rockshaft 20 which forms a part of the hydraulic unit 8. As best shown in Figure 2, a lug 24 is welded or otherwise permanently fixed to the central section 16 of the tractor drawbar 15 and is apertured, as at 25, to receive certain types of implements, such as a two-bottom plow, which may be reducible to a one-bottom plow, if desired.

According to the principles of the present invention, a two-bottom plow of the quick-attachable type, indicated in its entirety by the reference numeral 30, is adapted to be connected with the tractor drawbar 15. The two-bottom plow 30 comprises plow beam members 31, 32 and 33, suitably connected together to form a plow frame 34. The frame 34 also includes suitable braces 35, 36 and 37. Secured to the rear end of each of the plow beams 31 and 32 is a downwardly and forwardly extending standard 38 to which a mold-board plow bottom 39 is attached in any suitable way. A bracket structure 40 serves to fix each standard 36 to the associated plow beam.

The two left-hand plow beam members 31 and 32 are formed to converge forwardly, as best shown in Figure 2, and their forward converged ends are apertured to receive a pivot pin 41 which extends through a pair of lugs 42 welded or otherwise secured to a saddle member 43. The latter member is formed preferably of flat stock bent over onto itself in generally U-shaped configuration, as best shown in Figure 1, and the stock is trimmed so as to form a generally triangular structure, as shown in Figure 2. The forward apex section of the saddle member 43 is apertured to receive a detachable hitch pin 46, the hitch pin including a lower end section 47 adapted to pass downwardly through the openings in the saddle member 43 and the opening 25 in the bracket member 24 that is secured to the tractor drawbar member 16. A spring clip 48 serves to retain the hitch pin 46 in position. A second pair of rearwardly extending lugs 51 is fixed to the rear side of the saddle member 43 and receives a pivot pin 52 that passes through an apertured ear 53 formed on and extending forwardly of a vertically adjustable lug 54. The latter member is internally threaded to receive a leveling screw 55 which is rotated by a handle 56 and is held for rotation in a vertical U-shaped bracket 57. The bracket 57 is fixed to the forward end of the right-hand plow beam member 33, as best shown in Figure 2. A laterally inwardly extending bracket 61 is also fixed to the front end of the right-hand plow beam member 33 and receives a pivot 62 that extends in a transverse direction through an opening in the rear upturned end 66 of a longitudinally extending bar or stabilizing member 67. The rear end of the stabilizing bar or beam 67 is upturned and is apertured to receive a pair of bolts 71 which secure to the bar 67 a pair of spaced brackets 73 which are apertured to receive the trunnions 74 of a sleeve member 75. The forward threaded end of an adjusting strut 76 passes through the sleeve 75 and receives a pair of lock nuts 77 thereon. The rear end of the strut or link 76 receives a pair of pivot clamps 81 which are connected by a pivot pin 82 to a pair of generally outwardly offset, upwardly extending bracket plates 83, the lower portions of which are secured by the same bolts 84 that fasten the two plow beam members 32, 33 and the brace 35 together.

The front end of the stabilizing bar or beam 67 is arranged, when the two-bottom plow 30 is attached to the tractor, to extend forwardly underneath the rear axle 6 of the tractor and at its forward end rests in a vertically shiftable, depth adjusting bail member 95, the upper ends of which, as best shown in Figure 3, are apertured to receive a cross bar 96 that is carried in the rear lower ends of a pair of arms 97 and 98 which at their upper or forward ends are welded or otherwise suitably fixed to a cross shaft 99. The latter is supported in suitable bearing brackets 101 and 102 and at one end has an arm 103 fixed thereto and connected by a link 104 to an arm 105 formed on the left side member 14 of the tractor drawbar bail 15. Connection between the front end of the link 104 and the arm 103 is effected by means of a clamping swivel 106, and a similar clamping swivel 107 serves to connect the rear end of the link 104 with the upper end of the arm 105. The cross shaft 99 is held in the desired lateral position with respect to the bearing brackets 101 and 102 by clamp collars 109.

The two bearing plates 101 and 102 are adapted to be readily and quickly attachable to and detachable from the tractor 1, preferably the intermediate portion thereof forward of the rear axle 6. To this end, the tractor carries a pair of attaching plates 112, bolted to the tractor, as at 113 and 114. Each of the attaching plates 112 is provided with a forwardly facing notch 115 (shown in dotted lines in Figure 1) which is adapted to receive the cross shaft 99, the upper and lower edges of the notch 115 flaring downwardly and forwardly to facilitate movement of the shaft 99 and associated parts into position. Also, each of the bearing brackets 101 and 102 is provided with a rearwardly facing notch 117 which is adapted to receive a stud 118 carried by the associated tractor attaching bracket 112, each stud 118 receiving a wing nut 119.

The relative angular position of the stabilizing bar 67 to the plow frame may be adjusted by loosening one of the lock nuts 77 and tightening the other, thereby shifting the sleeve 75 along the strut 76 in one direction or the other and thus pivoting the plow frame about its pivotal connection with the longitudinal stabilizing bar or plow beam 67. The plow may be leveled by turning the adjusting screw 55 in one direction or the other.

A further modified form of the present invention is shown in Figure 4. Referring now to this figure, it will be noted that the adjusting strut 76 (Figure 1) and associated parts may be replaced by an overload release device in the form of a toggle linkage 170 connected at its front end, as by a pin 171, with the upper end of the upwardly extending portion 66 of the stabilizing beam 67. The rear end of the toggle linkage 170 is connected by a pin 172 to a bracket 173 fixed, as by welding, to the rear portion of a bar 33a that extends alongside the beam 32 and at its rear end is connected to the beam 32 and the bracket 40 by bolts 154. The forward end of the beam 33a is apertured to receive a pivot, similar to the pivot 62 described above, which extends through an aperture in the control bar 67 and an aperture in the adjacent end of the plow frame brace member 37a, the other end of which is bolted to the forward portion of the plow beam 32. In this form of the invention, the bracket 57, in which the leveling screw 55 is rotatably mounted, is fixed, as by welding, to the forward end of the bar 33a. The toggle linkage 170 comprises a pair of pivotally interconnected links 174 and 175 having their interconnected ends provided with cams which when the links pivot cause the interconnected ends of the links to separate against the force of resilient members 176 disposed about the ends of a pivot bolt 177 which defines the pivot axis about which the links 174 and 175 may move under an overload. So far as the present invention is concerned, the particular details of the overload release toggle linkage 170 are not new, being substantially the same as those shown in the prior patent to John I. Cantral 2,337,026, dated December 21, 1943, to which reference may be made if necessary.

In operation, if one of the plow beams 39 should strike an obstruction the toggle links 174 and 175 buckle upwardly, which permits the plow to swing upwardly and forwardly relative to the control bar 67, the plow frame pivoting upwardly and forwardly about the pivot pins 41 and 52.

When the overload release unit 176 and the plow frame pivot upwardly about the pins 41 and 52, it may sometimes occur that excessive strains are imposed on the adjusting ear 53 and the associated leveling screw 55. In order to relieve these parts of abnormal strains, in the event that the plow strikes an obstruction, we have provided a further modified form of the present invention which will now be described.

Figure 8:
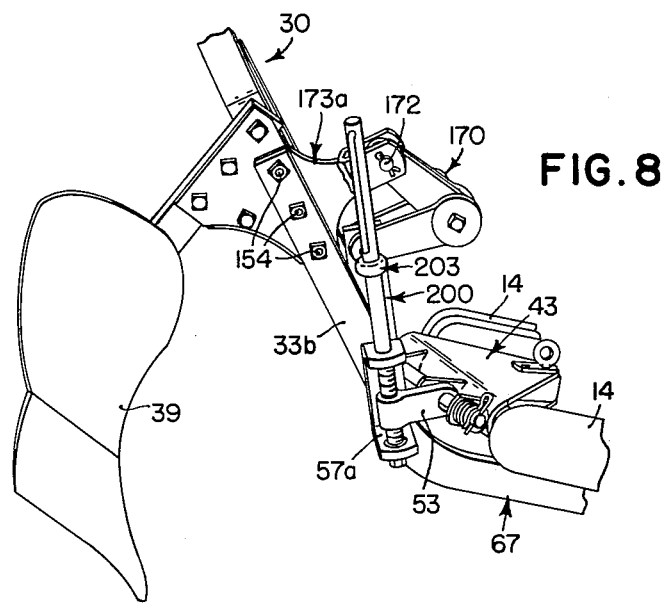
Figure 8 is a view similar to Figure 5, showing the plow in a tripped position.

Referring now to Figure 5, the frame of the plow is substantially like that indicated at 30 in Figures 1, 2 and 4, but instead of rigidly securing the leveling screw yoke to the plow frame, in the instant form of the invention the leveling screw yoke 57a is pivotally mounted on the pivot bolt 62a which connects the front portion of the bar 33b with the brace 37a. In this form of the invention, the leveling screw member, which is indicated in its entirety by the reference numeral 200, comprises an elongated rod threaded at its lower end and receiving the apertured ear 53. The rear portion of the latter member, as described above, is threadedly engaged with the lower threaded end of the adjusting screw member 200 and the forward end is apertured to receive the right-hand pivot pin 52. The upper portion of the leveling screw 200 is extended through the eye 202 of a pivot pin 203 which, in this form of the invention, connects the forward end of the toggle release unit 170 with the upper rear end of the control bar 67. By virtue of the leveling screw member 200 in this form of the invention, the leveling screw yoke 57a remains in alinement with the upper portion at the rear end of the control bar 67 whenever the unit 170 trips to permit the plow to swing upwardly as, for example, into the position shown in Figure 8. From this figure it will be seen that any pull transmitted to the plow frame after the plow has been tripped is transmitted directly through the ear 53 in a direction substantially normal to the axis of the leveling screw 200, whereby there is no tendency to bend or distort the latter member.

Figure 7:
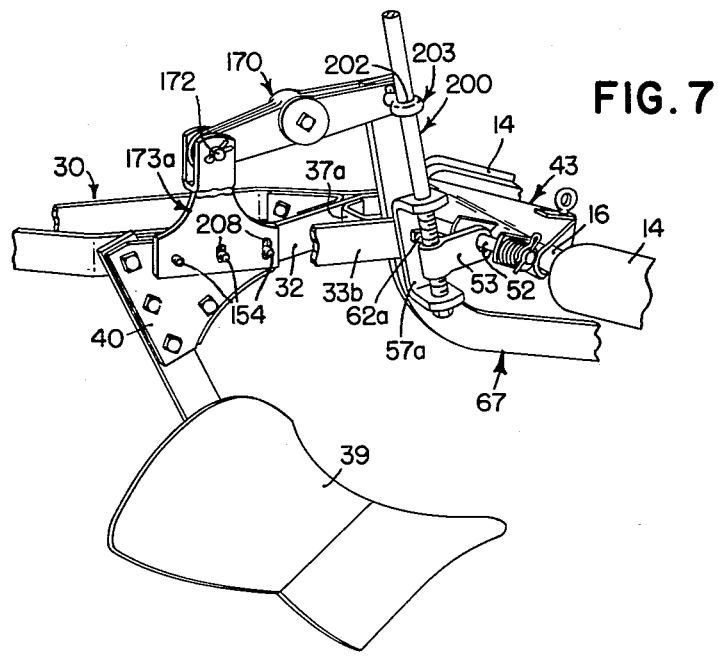
Figure 7 is a fragmentary view showing a modified form of fore-and-aft leveling means.

In the form of the invention shown in Figure 5, means is provided for adjusting the connection between the rear end of the toggle unit 170 and the plow frame, so as to provide for leveling the plow in a generally fore-and-aft direction. To this end, the rear bracket member 173a includes a lower attaching section 205 which is provided with a plurality of longitudinally extending slots 206 spaced to receive the bolts 154. The toggle unit 170 is pivotally connected at its rear end to the upper end of the bracket 173a by the pivot pin 172. By loosening the bolts 154, the bracket 173a may be shifted in a fore-and-aft direction along the rear end of the frame bar 32 and thereby level the plow in a fore-and-aft direction, since adjusting the bracket 173a has the effect of pivoting the control bar 67 about the pivot 62a and thus raising or lowering the front end of the control bar 67 relative to the plow frame. If desired, the bracket 173a may be made, as shown in Figure 7, with vertical slots 208 receiving two of the three attaching bolts 154, whereby the bracket 173a may be rocked to shift the upper portion in a generally fore-and-aft direction, thereby securing an adjustment by which leveling of a plow in a fore-and-aft direction may be effected.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. The combination with a tractor having a vertically swingable bail and means on the tractor for swinging said bail, of an agricultural machine including a ground working tool and an attaching part shaped to receive the rear portion of said bail, means for connecting said attaching part to said bail, a rigid member connected with said tool and extending forwardly of the tractor beyond said bail, means pivotally connecting said tool and rigid member to said attaching part for movement about a generally transverse axis, a bracket having a portion longitudinally adjustable relative to said ground working tool, and overload release means connected between said rigid member and said bracket portion for releasably holding said tool and rigid member against relative movement about said transverse axis.

2. For use with a tractor having a vertically swingable bail and means on the tractor for swinging said bail, the improvement comprising an agricultural machine including a ground working tool, an attaching part shaped to receive the rear portion of said bail, means for connecting said attaching part to said bail, a rigid member connected with said tool and extending forwardly of the tractor beyond said bail, means pivotally connecting said tool and rigid member to said attaching part for movement about a generally transverse axis, a bracket having a portion longitudinally adjustable relative to said ground working tool, and overload release means connected between said rigid member and said bracket portion for releasably holding said tool and rigid member against relative movement about said transverse axis.

3. For use with a tractor having a rearwardly extending, generally vertically swingable bail, a forwardly mounted, vertically swingable bail, and means on the tractor for swinging said bails, the improvement comprising an agricultural machine including frame means having ground-working tool means, an attaching part adapted to be connected to the rear bail, means for connecting the forward portion of said frame means with said attaching part for pivotal movement relative thereto about a generally transverse axis, a stabilizing bar having a generally forwardly extending portion adapted to extend forwardly underneath the rear bail and to be connected at its forward end with said forward bail, said bar having at its rear end a generally vertically extending portion, means pivotally connecting the rear portion of said stabilizing bar with said frame means adjacent said axis, means for effecting a lateral leveling of said frame means, comprising a part pivotally connected with said attaching part in line with said transverse axis, an adjusting screw threadedly engaged with said leveling part, a yoke supporting said screw and pivotally connected with said frame means for movement relative thereto about an axis coinciding with the axis of pivotal connection of the rear portion of said stabilizing bar with said frame means, means carried adjacent the upper portion at the rear end of said stabilizing bar for receiving said adjusting screw, and a connection between the upper rear portion of said stabilizing bar and said frame means rearwardly of said axes.

4. The invention set forth in claim 3, further characterized by said connection comprising overload responsive means normally resisting upward pivoting of said frame means about the axis of pivotal connection between said frame means and the rear portion of said stabilizing bar, said second mentioned part and said adjusting screw being movable with said stabilizing bar relative to said frame means when said overload responsive means acts to accommodate an upward pivoting of said frame means relative to said stabilizing bar.

5. Control mechanism for a plow of the type that is adapted to be connected to a tractor and which includes frame means, a control bar pivotally connected at its rear end with said frame means and extending upwardly and rearwardly from said point of pivotal connection, and overload release means adapted to act between said frame means and the upper end of said control bar, said control mechanism comprising a bracket attachable to the plow frame rearwardly of said point of pivotal interconnection between the plow frame and said control bar and adapted to pivotally receive said overload release means, means providing for fore-and-aft adjustment of the upper portion of said bracket relative to said frame means, a hitch part adapted to connect one side of said frame means with the tractor and including a nut section, an adjusting crank screw having a lower threaded end disposed in said nut section, whereby rotation of said crank screw serves to raise and lower said hitch part, a yoke receiving the lower portion of said crank screw and pivotally connected with said plow frame substantially on the axis of the pivotal connection between said plow frame and said control bar, and support means carried at the upper end of said control bar and forming the connection between the front end of said overload release means and said control bar, said connection receiving and supporting the upper portion of said crank screw.

References Cited in the file of this patent

UNITED STATES PATENTS

| 313,286 | Casaday | Mar. 3, 1885 |
| 1,449,783 | Schlagel | Mar. 27, 1923 |
| 2,319,670 | Ego | May 18, 1943 |
| 2,337,026 | Cantral | Dec. 21, 1943 |
| 2,445,145 | Love | July 13, 1948 |
| 2,604,834 | Silver et al. | July 29, 1952 |
| 2,635,517 | Silver et al. | Apr. 21, 1953 |
| 2,685,241 | Silver et al. | Aug. 3, 1954 |

FOREIGN PATENTS

| 116,665 | Sweden | June 25, 1946 |